United States Patent
Setoguchi (10) Patent No.: US 7,782,322 B2
(45) Date of Patent: Aug. 24, 2010

(54) PLANE SHAPE CREATION SYSTEM, PLANE SHAPE CREATION METHOD AND PROGRAM RECORDING MEDIUM

(75) Inventor: Ryozo Setoguchi, Suginami-ku (JP)

(73) Assignee: Setoguchi Laboratory Ltd., Tokyo (JP)

( * ) Notice: Subject to any disclaimer, the term of this patent is extended or adjusted under 35 U.S.C. 154(b) by 0 days.

(21) Appl. No.: 10/557,296

(22) PCT Filed: May 19, 2003

(86) PCT No.: PCT/JP03/06221
§ 371 (c)(1),
(2), (4) Date: Nov. 18, 2005

(87) PCT Pub. No.: WO2004/104869
PCT Pub. Date: Dec. 2, 2004

(65) Prior Publication Data
US 2007/0018987 A1    Jan. 25, 2007

(51) Int. Cl.
*G06T 11/20*    (2006.01)
(52) U.S. Cl. ............... 345/442; 345/423; 345/420; 345/606
(58) Field of Classification Search ............ 345/420, 345/423, 441, 442
See application file for complete search history.

(56) References Cited

U.S. PATENT DOCUMENTS

| | | | |
|---|---|---|---|
| 5,193,145 A * | 3/1993 | Akeley ............... | 345/423 |
| 5,307,450 A * | 4/1994 | Grossman ............ | 345/423 |
| 5,497,451 A * | 3/1996 | Holmes ............... | 345/420 |
| 5,621,872 A * | 4/1997 | Tokumasu et al. ..... | 345/442 |
| 6,326,968 B1 * | 12/2001 | Horikawa et al. ..... | 345/428 |
| 6,356,263 B2 * | 3/2002 | Migdal et al. ........ | 345/423 |
| 6,650,324 B1 * | 11/2003 | Junkins .............. | 345/423 |
| 7,142,206 B1 * | 11/2006 | Moreton .............. | 345/419 |
| 7,348,976 B2 * | 3/2008 | Mori ................. | 345/423 |
| 2002/0005856 A1 * | 1/2002 | Sasaki ............... | 345/606 |
| 2002/0171644 A1 * | 11/2002 | Reshetov et al. ...... | 345/420 |

* cited by examiner

*Primary Examiner*—Kee M Tung
*Assistant Examiner*—David H Chu
(74) *Attorney, Agent, or Firm*—William L. Androlia; H. Henry Koda (57) ABSTRACT

When a fixed polygonal plane patch is called a polygonal plane patch of level 0 and when each vertex of such polygonal plane patch is called a shape composition point of level 0, a normal line of level 0 is set on each shape composition point of level 0, and each normal line of level 0 is decomposed on an equivalent tangent plane to the normal line of level 0. Moreover, a tangent line of level 0 is set by a decomposition in a direction equal to or in the vicinity of the edge of the polygonal plane patch of level 0; and based upon two tangent lines of level 0, a normal line is set on a shape composition point and on a shape composition point of level 1. A plane shape is formed by repeated controls of the above one after another.

10 Claims, 7 Drawing Sheets

S F 1 : PLANE SHAPE GENERATING SUBSYSTEM

$NA \times NB = S$ $S \times TD = ND$

P P 1 : BASIC TRIANGLE SHAPE TYPE PLANE PATCH (TRIANGLE ABC)

FIG. 9

P P 2 : BASIC QUADRANGULAR SHAPE TYPE PLANE PATCH (QUADRANGULAR ABCD)

FIG. 10

PLANE SHAPE CREATION SYSTEM, PLANE SHAPE CREATION METHOD AND PROGRAM RECORDING MEDIUM

TECHNICAL FIELD

The present invention relates to a system for generating a plane shape, to a method for generating a plane shape and to a recording medium for a program for generating a plane shape.

BACKGROUND ART

An interpolation method is carried out when curved surface is generating, which executes as the geometric modeling (geometric representation) until now using position information and tangent line information, when the curved surface shape is created.

By discretely placing the point of the envelope (boundary (border) line) of curved surface, interpolation shape generating method using position information and tangent line information is the digital expression of curved surface expressed by linearly combining.

That is to say, the interpolation shape generating method described above is the continuous expression of the polygonal line which envelopes mere curved surface as a combinative composition expression of the line formed body type.

Until now, curved surface is created by the function description, when curved surface is created.

The curved surface is created as what is called interpolation geometric modeling (representation).

The curved surface is expressed by combining piecewise polynomials, when curved surface is expressed like this based on the function.

There are next methods of (1) and (2), when the example is classified convention described above.

(1) The Expression by the Boundary Condition.

The boundary conditions described above are position information and tangent line information of the vertex (top position) of the boundary, which expresses the shape, etc. The expression by boundary condition decides the polynomial coefficient based on the boundary condition, and it is a method for expressing the curved surface.

<Polynomial (Equation)> described above uses generally <the 3rd ordered spline Function> abundantly.

In this meaning, the generation of the curved surface based on function descriptions direct generating method that creates the composition point in the curved surface as an interpolation by the boundary condition.

(2) The Method by the Control Polygon.

The method by the control polygon is a method for deciding the polynomial coefficient as weighting (loading) expression of the position information of the control polygon.

<The weighting (loading) expression> described above is the weighting (loading) function (expression) of the coefficient.

As relating accurately, the method by the control polygon decides the weighting function based on the polynomial basis, and it uses the position information of the control polygon, and it is a method for determining composition point in the curved surface by decided weighting function (loading function).

By using basis expression, there are Bezier expression or B spline expression. The Bezier expression is the expression based on the 2nd term basis, and the Barnstein's basis is used the B spline expression described above.

Binomial basis is a special basis of the Bernstein's basis.

In this meaning, the method by the control polygon is indirect generating method of the curved surface by the control polygon based on function description.

There is a problem of taking many times in order to make the control polygon, and there is a problem that it cannot be judged immediately requirement control polygon.

That is to say, the shape of the requirement is decided in the prospect in the example of conventional shape generating method described above, and so by many recurring times, the shape of the requirement is obtained in respect of the adjustment of the shape, if the inconvenience occurs by shape generating based on this prospect.

Here, it is complicated to carry out generation shape, and there is a problem of preventing the speedup of the treatment.

In short, it is not possible to simply construct the shape generating mechanism in case of the practical example in the conventional shape generating method described above, when the plane in curved surface, etc. is created, and moreover it is not possible to do the processing speed high-speed and the problem that to efficiently deal with is not possible occurs. This invention, when the plane like curved surfaces, etc. is expressed, the mechanism of the shape generating is simple, and it is made that recording medium of generating system and generating method and program of plane shape of tangent plane by the covering in which that to simply construct the shape generating mechanism is possible and that it does processing speed high-speed is possible are offered to be a purpose. This invention, when the plane like curved surfaces, etc. is expressed, the mechanism of the shape generating is simple, and it is possible to simply construct the shape generating mechanism. It is made that recording medium of generating system and generating method and program of plane shape of tangent plane by the covering in which to do processing speed high-speed is possible are offered to be a purpose.

DISCLOSURE OF INVENTION

Since it is faced in respect of the plane shape of the desire, this invention constitutes fundamental polyhedron which for the first time it composed all shapes of the desire of the sparse shape and within the polygonal patch which forms the fundamental polyhedron, the patch in which generation of the plane shape is necessary is chosen.

Here, shape generating treatment based on the interactive environment, which visually and operationally carries out the shape generating treatment, is carried out.

Chosen patch is drawn on the screen of the information processing equipment that possesses input unit such as mouse and joystick.

By this, the necessary pretreatment for the plane shape generation is complete.

This kind of interactive environment described above is constructed as a subsystem for the plane shape generation.

As a first phase (0th plane shape generation level) for plane shape generation, normal line which is equivalent to the tangent line based on the plane shape generating subsystem as related already for the vertex (top position) of chosen patch is given.

The normal line is decomposed over tangent plane along the patch boundary at each boundary vertex (top position) of the generated object patch, and it is required as each set of tangent lines the vertex that corresponds the tangent line along the boundary line.

Next, the set in the tangent line which obtained the boundary normal line by decomposing, is used as a second stage (plane shape generation level 1), and then for setting the equivalent normal line with tangent plane between corresponding vertex (top position), tangent line and composition point of curved surface formed shape are obtained between the corresponding vertex of the curved surface formed shape. As a 3rd stage (plane shape generation level 1), it is specified as a normal line on the shape composition point determining normal line in the 2nd stage as basic requirement of the plane shape generating method on term 2 and 3 of patent claim.

Figure 4:
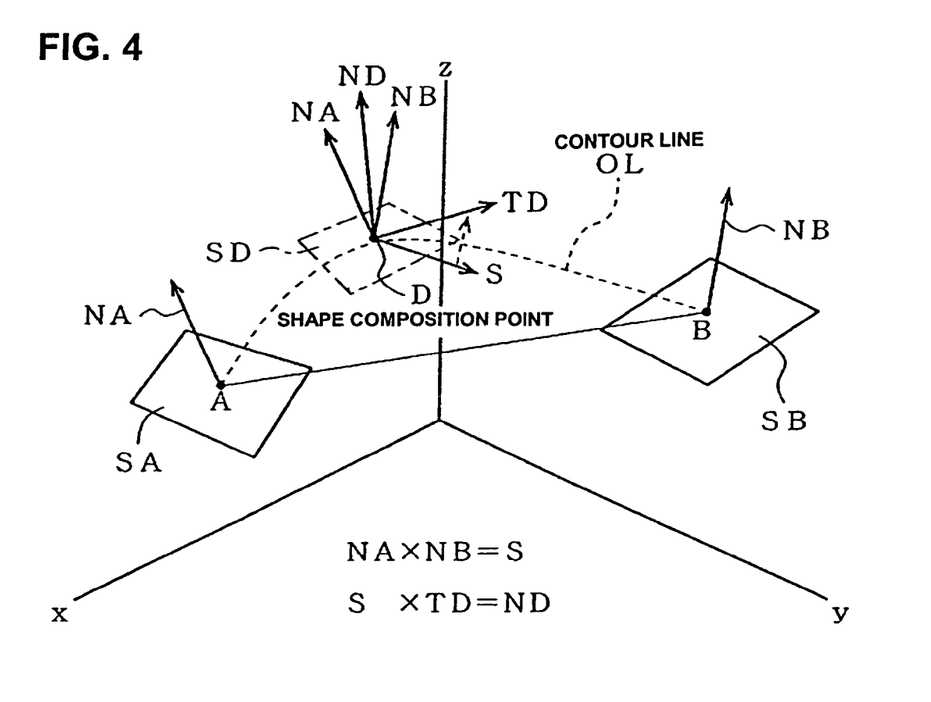
FIG. 4 is an explanatory drawing which shows composition procedure of equivalent normal line ND with tangent plane SD of level 1 by tangent line set at set shape composition point D of level 1 and shape composition point D of level 1 in practical example described above.

Here, the normal line is determined by determined composition point of the target shape and tangent line, as it is shown in FIG. 4.

Figure 7:
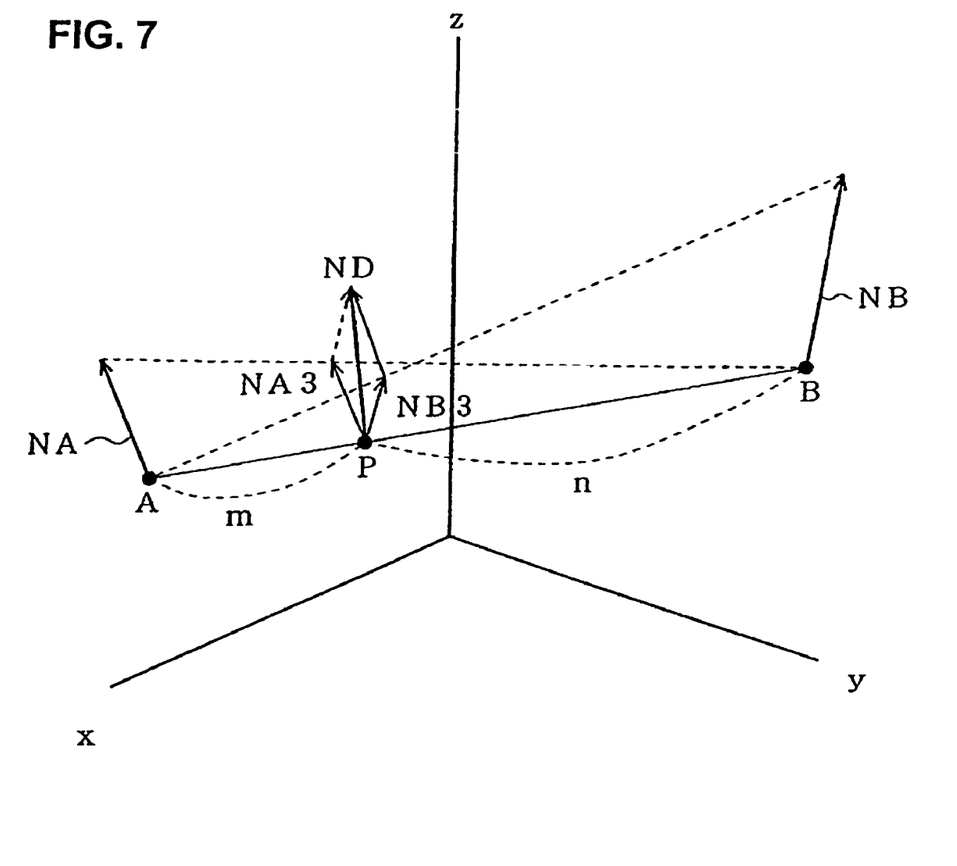
FIG. 7 requires normal line NA3 and NB3 in proportion to division point P by the homologous triangle based on division point P and is an explanatory drawing which shows the procedure as normal line ND of shape composition point D in respect of synthesis vector of the NA3 and NB3 vector.

And, there are some methods as the 2nd methods in search of the normal line on the composition point of the target shape based on only the composition point of the shape, as it is shown in FIG. 7.

Figure 8:
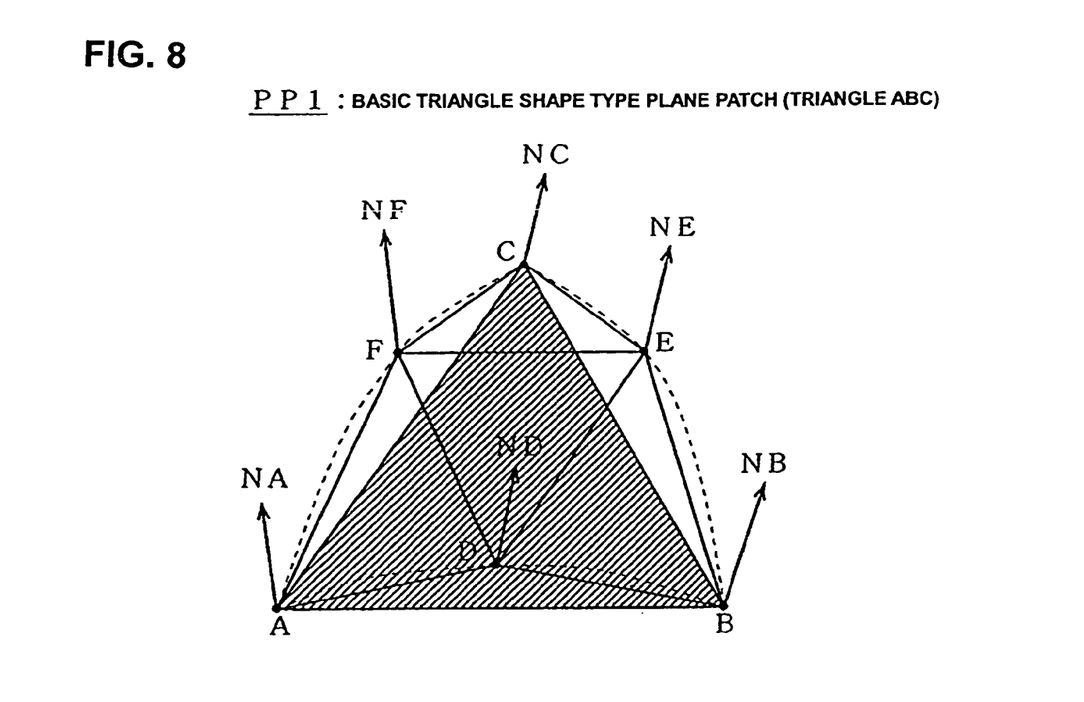
FIG. 8, in the practical example described above, is the figure which shows that it is sequentially make respectively 3 edge AB, BC, CA of plane patch PP1 of the triangle as the triangle which is the basic polygon for creating the fixed shape in respect of normal line ND, NE, NF of the level 1 and which shows the process which forms the new polyhedron shape.
Figure 9:
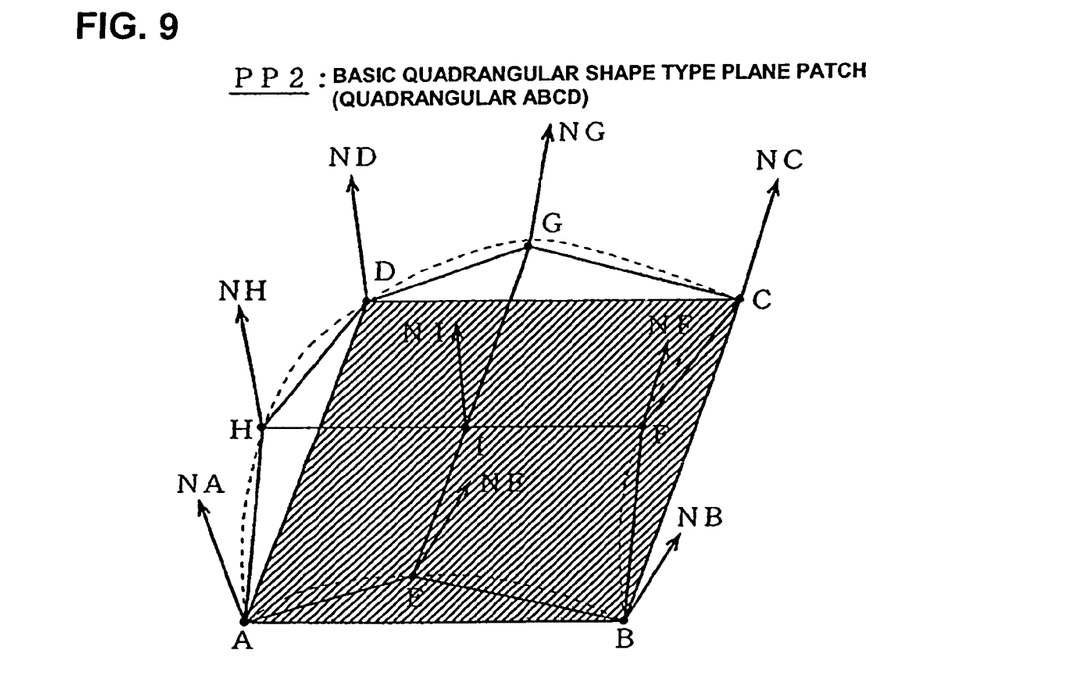
FIG. 9 in the practical example described above, is the figure which shows the composition by the process which divides plane patch PP2 of the quadrangular state in making the basic polygon for creating the fixed plane to be the quadrangular state, at shape composition point E, F, Q H of the level 1 in respect of normal line NE, NF, NC, NH of the level 1 and which shows the process which forms the new polyhedron shape.

As the 4th stage (plane shape generation level 1), the polygon patch is constituted as a new shape vertex (top position) in respect of each fixed composition point of the target, and more in the shape which makes chosen patch to be the basic patch, the new polyhedron shape is constructed on this basic patch, as it was shown in FIG. 8 and FIG. 9.

As the 5th stage (plane shape generation level 2), the tangent line is obtained on each of polygonal patch which is the composition patch of made polyhedron as well as the 1st phase and in addition, the plane shape composition point for determining the normal line which with necessary tangent plane with the 2nd stage next step in the same way is obtained.

The equivalent normal line over this composition point of two target shapes by the method equal to the 3rd stage with tangent plane is obtained.

As the 6th stage (plane shape generation level 2), the procedure equal to the 4th stage is constituted, and polyhedron shape divided again (re-divided) further is constructed on the basic patch.

As the 7th stage (plane shape generation level 3~n), 5th stage and 6th stage are reflexively repeated one after another, and then by covering basic patch full face in the tangent plane, the plane shape of the desire is formed.

As the 8th stage, the sequential selection of the patch in which generation of the plane shape of the desire is necessary within the polygonal patch which constitutes the basic polyhedron is done, and then on each chosen patch, the control course which repeats the procedure of the 7th stage one after another from the 1st phase is constructed, and so It is the system which forms polyhedron shape which possesses the plane shape of the desire.

BEST MODE FOR CARRYING OUT THE INVENTION

Figure 1:
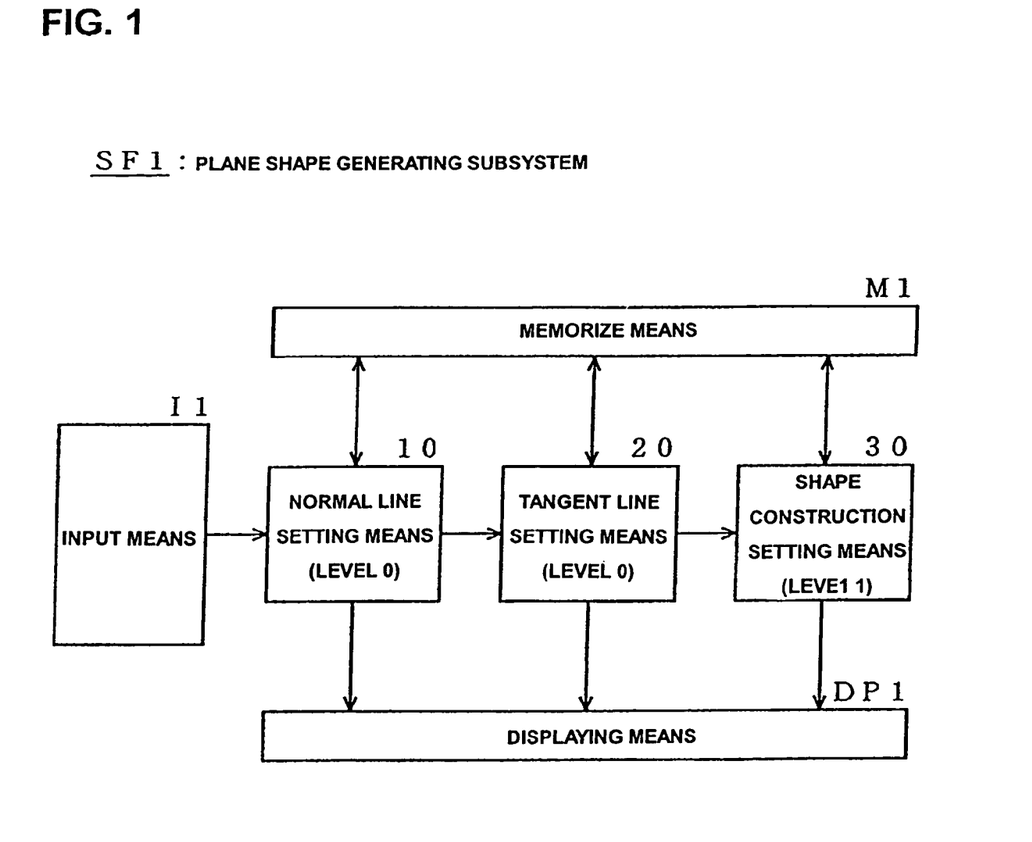
FIG. 1 is a block diagram which shows the composition of plane shape generation subsystem SF1 constructed in order to set boundary normal line of the necessary polygonal basic patch in plane shape generating of this invention as initial condition.

FIG. 1 is the exemplification of the building block diagram that shows composition condition of plane shape generation subsystem SF1 that it is one of the execution forms of this invention.

As an input means here, the following are considered: mice and joysticks described above, etc.

It is possible to construct the conversational system which functions by linking with the display screen, when input means of this species is used.

Figure 2:
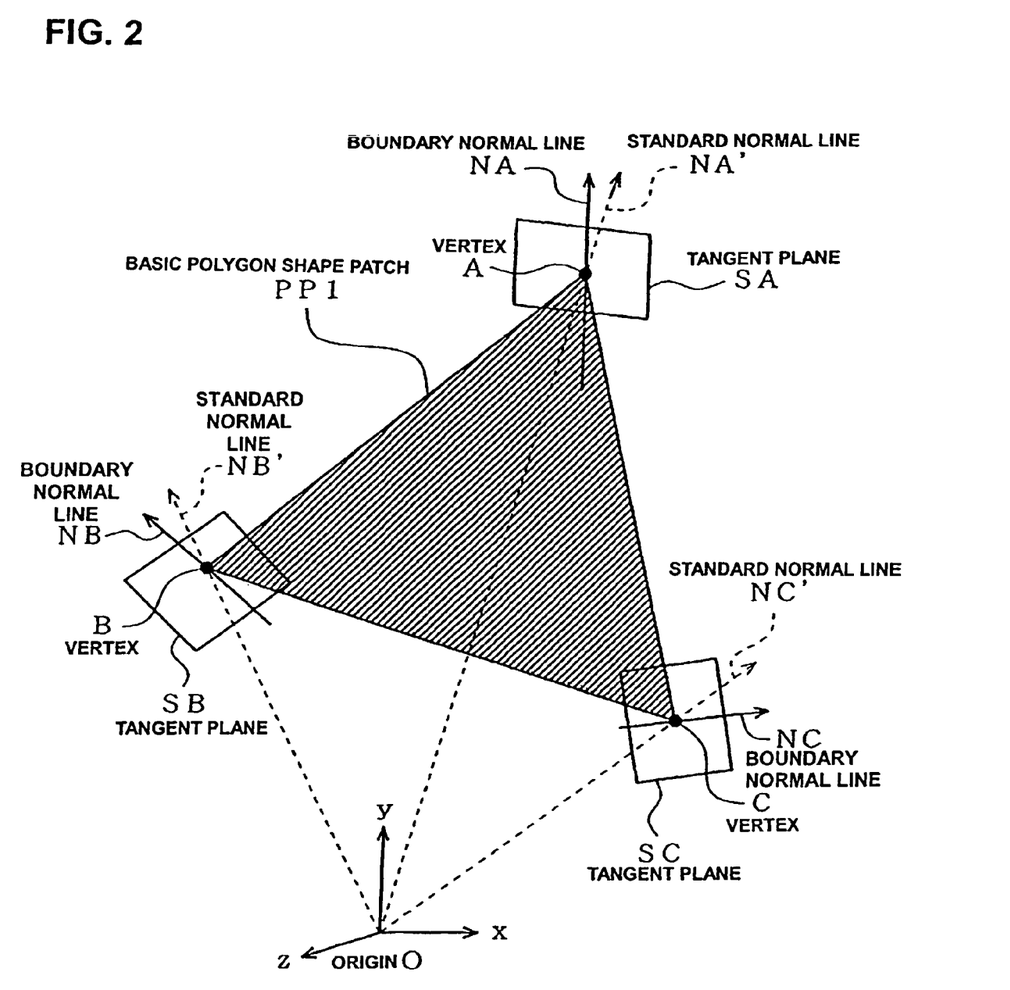
FIG. 2 is a figure in proportion to plane shape generation level 0 which shows setting condition of normal line NA, NB, NC which is equivalent to the tangent plane set triangle patch PP1 boundary vertex (top position) A, B, C basis polygon patch, when desire plane shape, by plane shape generation subsystem.

FIG. 2 shows setting process of normal line NA, NB, NC set on boundary top A, B, C of triangular planes patch PP1.

Normal line NA', NB', NC' shown in the broken line is a normal line on spherical surface as a standard and normal line NA, NB, NC shown in continuous line which is equivalent to tangent plane on the patch top necessary for forming the plane shape of the desire.

By adjusting standard normal line NA' and NB' and NC' in addition to basic patch PP1 as an initial condition necessary for plane shape generation, normal line setting stage of this desire is correspondent with plane shape generation level 0 which sets boundary normal line NA, NB, NC of the desire.

By covering the tangent plane in the plane shape of the desire, generating system of the plane shape is the system which creates the plane shape of the desire, and moreover the fixed polygonal plane patch is called polygonal plane patch of level 0 and each vertex (top position) of polygonal plane patch of 0 level described above is called shape.

In addition, it is generating system of the plane shape, which is established based on polygonal plane patch of level 0 described above and shape composition point of level 0 described above in the shape.

Still, <level 0> described above is the meaning of the 0th stage (that is 0th layer), and <level 1> described above is the meaning of the 1st phase (that is 1st layer), afterward 2nd stage (that is 2nd layer) and 3rd stage (that is 3rd layer), . . . and Stages are raised every shape generating.

And, generating subsystem of the plane shape has input means I1 and display means DP1 and memory means M1 and normal line setting means of 10 of level 0 and tangent line setting means of 20 of level 0 and shape composition point setting means of 30 of the level 1.

Input means I1 is a means for inputting the necessary data in creating the plane shape and is a means for inputting information of the vertex (top position) on polygonal planes patch PP1 of level 0, etc.

Display means DP1 displays the shape in the middle of generating shape point in the process, which creates the plane shape and is a means for displaying completed plane shape.

Memory means M1 is the memory which stores the data of triangular plane patch PP1 which constitutes the basic polygon for creating the plane and generating processes or data of plane shape in which the generating was completed, etc.

Normal line setting means of 10 of level 0 is an example of the means for setting the normal line of level 0 in each of shape composition point (triangular vertex) of level 0.

Tangent line setting means of level 0 decomposes each normal line of level 0 set as described above on the tangent plane which is equivalent to normal line of level 0 described above and moreover is an example of the means for setting the tangent of level 0 by decomposing for direction equal to the edge of polygonal plane patch of level 0 or vicinity of the edge.

Still, the direction of resolved tangent line is a direction equal to the edge of the polygonal plane patch for the direction equal to the edge of polygonal plane patch of level 0 described above, when the normal line is decomposed, and in the meantime, the direction of resolved tangent line is a direction unlike the edge of the polygonal plane patch for the vicinity of the edge, when the normal line is decomposed.

Still, tangent plane described above is the plane which contacts the fixed shape composition point (triangular vertex (top position) in level 0), and it is a plane with normal line that is orthogonalized to the plane.

Shape composition point setting means of the level 1 is an example of the means for setting shape composition point of the level 1 based on two tangent lines of n level 0 described above.

Next, the action of generating subsystem SF1 of the plane shape above shape is explained.

To begin with, the triangle plane patch is called polygonal plane patch of level 0 and each vertex (top position) A, B, C of triangles plane patch PP1 of level 0 is called shape composition point of level 0, and moreover target shape is established based on triangle plane patch of level 0 described above and shape composition point of level 0 described above in the shape.

Still, the shape composition point described above constitutes the part of the boundary (order) line of the shape of the desire.

Then, normal line setting means of 10 of level 0 sets normal line NA, NB of level 0 based on input data from input means I1 in each of vertex (top position) A, B (shape composition point of level 0) of triangular plane patch PP1, (S1).

Figure 3:
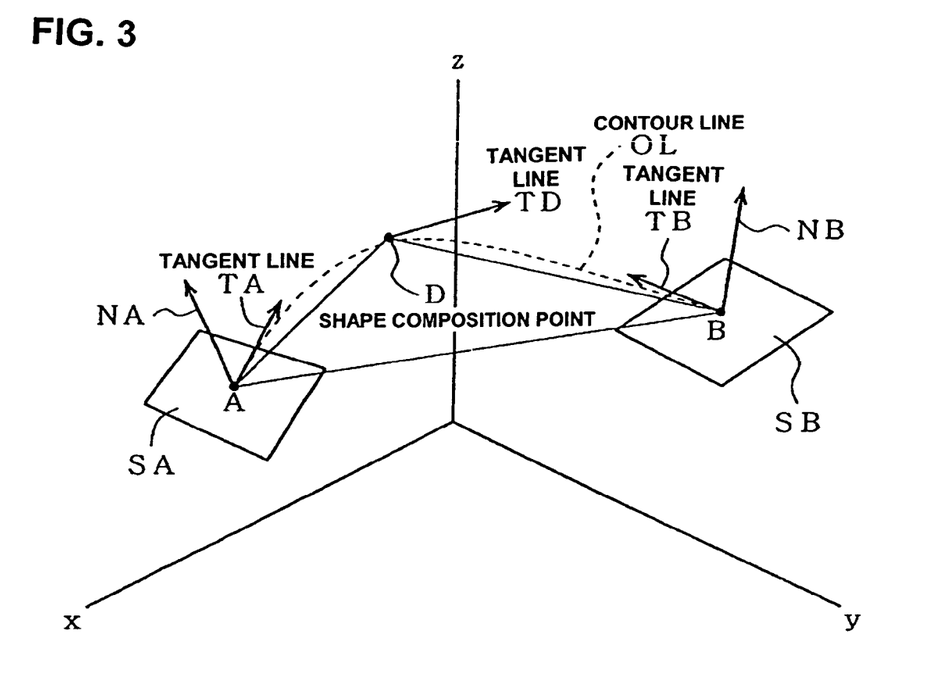
FIG. 3 decomposes the normal line which was decided in practical example as related above by tangent line setting means of 20 of level 0 and is an explanatory drawing of the procedure for setting shape composition point D of level 1 and tangent TD on composition point D.

FIG. 3 is an explanatory drawing in setting shape composition point D of level 1 as practical example done the interval in term 3 of patent claim.

On tangent plane SA, SB which is respectively equivalent to normal line NA, NB of level 0, normal line NA, NB of level 0 is decomposed in each normal line, and moreover, tangent line TA, TB of level 0 is set by decomposing for direction equal to edge AB of the triangle plane patch of level 0 or vicinity of the edge, (S2).

Moreover, tangent line TA, TB of level 0 is set by decomposing for direction equal to edge AB of the triangle plane patch of level 0 or vicinity of the edge, (S2).

Namely, tangent TA is orthogonalized with normal line NA, and it exists on tangent plane SA including top A and is a line for direction equal to edge AB or vicinity of the edge AB. And, tangent TB is orthogonalized with normal line NB, and it exists on tangent plane SB including vertex (top position) and is a line for direction equal to edge AB or vicinity of the edge AB.

Afterwards, shape composition point D of the level 1 is set based on tangent line TA, TB of level 0, (S3).

FIG. 4 is figure which shows the constitutive formula of normal line ND which is equivalent to tangent plane SD of level 1 set at shape composition point D of level 1 based on tangent TD of shape composition point D and on composition point D of level 1 which tangent setting means of 20 of level 0 set in superscription practical example.

In this case, S is required in practical example described above as a vector product of normal line NA, NB of level 0.

Next, the vector product of tangent line TDA and vector S of level 1 is obtained. It is normal line ND on composition point D that this requires.

Figure 5:
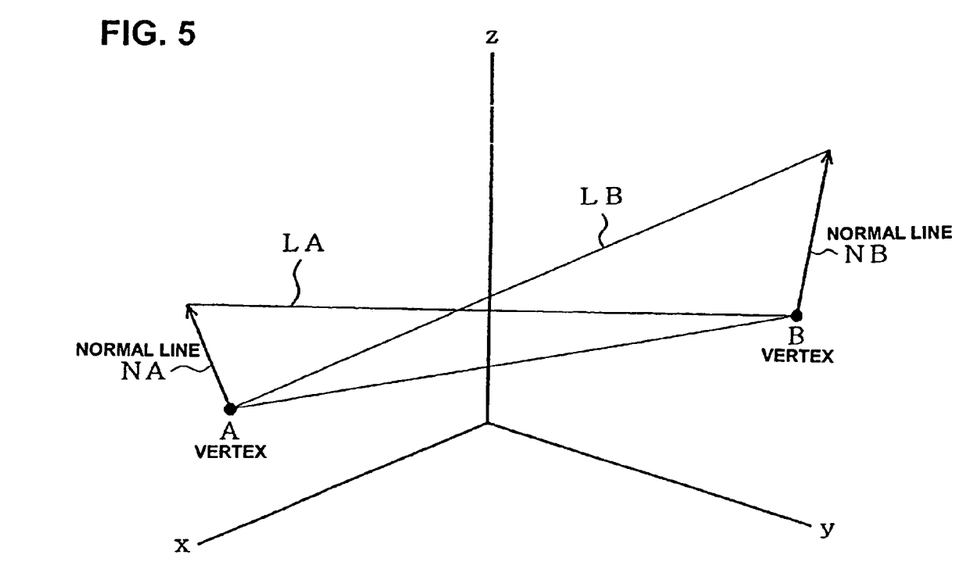
FIG. 5 is an explanatory drawing which shows the procedure for setting 8 (top position) A top B normal line NB plane PANB top B top A normal line NA plane PBNA.
Figure 6:
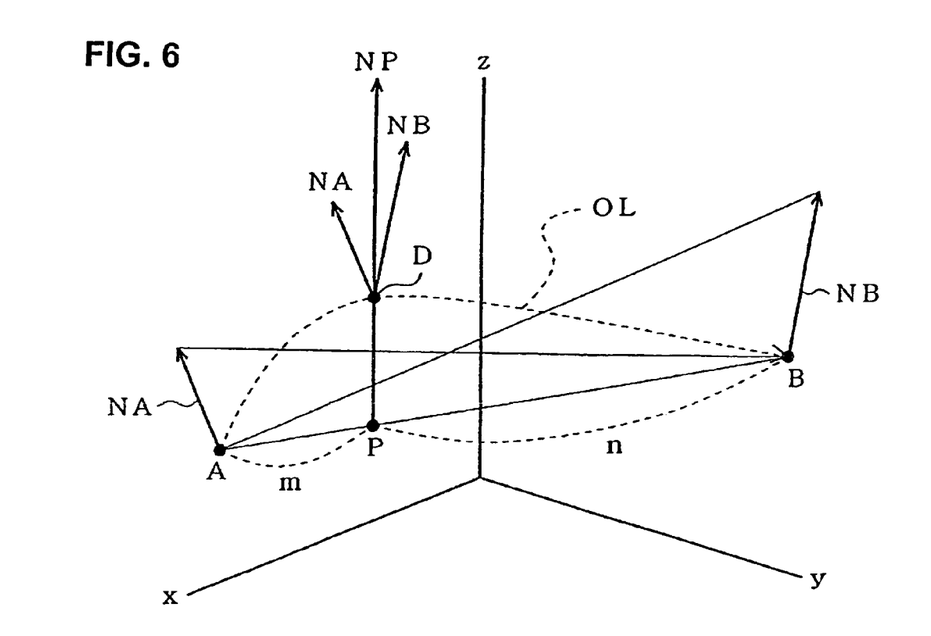
FIG. 6 decomposes normal line NA, NB of vertex (top position) A, B by tangent line setting means of 20 of level 0 and shape composition point D of the level 1 is set, and moreover the unit vector of normal line NA, NB is made over composition point D, and then this synthesis vector requires intersection point P with span LAB which vertex (top position) A, B makes.

They are figures of 5, figures of 6, and FIG. 7 is a practical example as detailed procedure on patent demand term of 4. The practical example here is a method only by shape composition point D in search of normal linc ND on composition point D.

Plane PBNA including vertex (top position) A and plane PANB including normal line NB on vertex (top position) B and vertex (top position) B and normal line NA on vertex (top position) A is set, as it was shown in FIG. 5.

In FIG. 6, normal line NA, NB of vertex (top position) A, B is made to be unit normal line of NA2 and NB2 and by tangent line setting means of 20 of level 0, tangent line TA, TB are resolved based on asked tangent TA, TB, shape composition point D of the level 1 is set.

The movement of normal line of NA2 and NB2 is done over composition point D and synthesis vector of transfer normal line NA2 and NB2 requires intersection point P with span LAB which vertex (top position) A, B makes.

Next, the split ratio of segment LAB by this intersection point P is decided.

Finally, the homologous triangle is constituted on plane PANB, PBNA in FIG. 7 in order to be correspondent with division point P and vector line minute NA3 and NB3 in proportion to this split ratio is obtained.

This synthesis vector of normal vector of NA3 and NB3 becomes normal line ND of shape composition point D.

FIG. 8 is the figure which shows the process which form respectively normal line ND, NE, NF of the level 1 and sequentially made as the triangle which is the basic polygon for establishing in the fixed shape in the actual example described above in respect of normal line ND, NE, NF on 3 edge AB, BC, CA of planes patch PP1 of the triangle and which forms the new polyhedron shape.

In FIG. 8, basic triangle plane patch PP1 is shown in the oblique line.

The action described above is a action in setting shape composition point D of the level 1 from the viewpoint of one triangular edge AB, and however, shape composition point E, F of the level 1 is also respectively set on 2 edge BC, CA when it is triangular as well as the superscription.

That is to say, by doing as described above, tangent line of TA and TB is decided by the decomposition of B (top position) vertex top (the shape composition point) A and the normal line of NA and NB and the normal line of NB and NC is also similarly decomposed on vertex (top position of the shape composition point) of B and C, after shape composition point D of the level 1 and the normal line ND is set, and tangent line of TB and TC are decided, and then shape composition point E of the level 1, and, in the same way, tangent line of TC and TA is decided based on A vertex (top position of the shape composition point) C and NA the normal line NC, and shape composition point F of the level 1 and the normal line NF are set.

Then, the new triangle is formed by shape composition point D, E, F of the level 1 described above.

And, new three triangular ABD, BCE, CAF are formed by three edge AB, BC, CA of the plane patch which constitutes basic triangular PF1 and each of shape composition point D, E, F of level 1 described above.

Still, new 3 triangles of the above description are constituted as first of the basic triangle plane patch, the 2nd vertex (top position) A, B and triangular ABD formed by shape composition point D of the level 1 and the 2nd basic triangle plane patch, the 3rd vertex (top position) B, C and triangular CAF formed by triangular BCE formed by shape composition point E of the level 1 and the 3rd basic triangle plane patch, the first vertex (top position) C, A and shape composition point R of the level 1.

In short, new 4 triangles are formed from the basic triangle plane patch by the operation described above.

The basic triangle plane patch is called <triangle of level 0> and Triangularly form new 4 triangles of level 0 are called <triangle of level 1>.

The operation equal to the above description is executed on triangular each of level 1, and four triangles are respectively formed from each triangle of level 1 and triangularly basing and formed triangle of level 1 is called "triangle of level 2".

In short, 16 triangles of level 2 are formed from four triangles of level 1. By doing like this, in proportion to the accuracy of the shape generating, the triangle of level 3, 4, . . . is formed.

Then, the shape of the desire is created according to the envelope which connected superscription shape composition point at level 3, 4 . . .

FIG. 9 does the basic polygon for creating the fixed plane in the practical example described above with the quadrangular state, and it sets normal line NA, NB, NC, ND of level 0 at four vertexes (tops position of shape composition point of level 0) of plane patch PP2 of the quadrangular state, and then here normal line are decomposed, and new shape composition point E, F, G, H of the level 1 and normal line NE, NF, NC, NH of the level 1 are formed, and it is the figure which shows the process which forms the In the practical example described above, basic tetrahedron plane patch PP2 is assumed as plane patch which constitutes the basic polygon for creating the plane of the desire and normal line NA, NB, NC, ND of level 0 is set at these quadrangular four vertex (tops position of shape composition point of level 0).

Normal line NE, NF, NG, NH of the level 1 is set at shape composition point E, F, G, H of the level 1. In FIG. 9, basic tetrahedron plane patch PP2 was shown in the oblique line. In this case, shape composition point I of level 1 for creating the plane shape in center of FIG. 9 has been described.

Shape composition point I of the level 1 is decided based on normal line NE, NF, NG, NH of shape composition point E, F, G, H of level 1, and moreover, normal line NI of the level 1 in shape composition point I of level 1 is set based on shape composition point E, F, G, H of the level 1 and normal line NE, NF, NG, NH of the level 1 in these.

Figure 10:
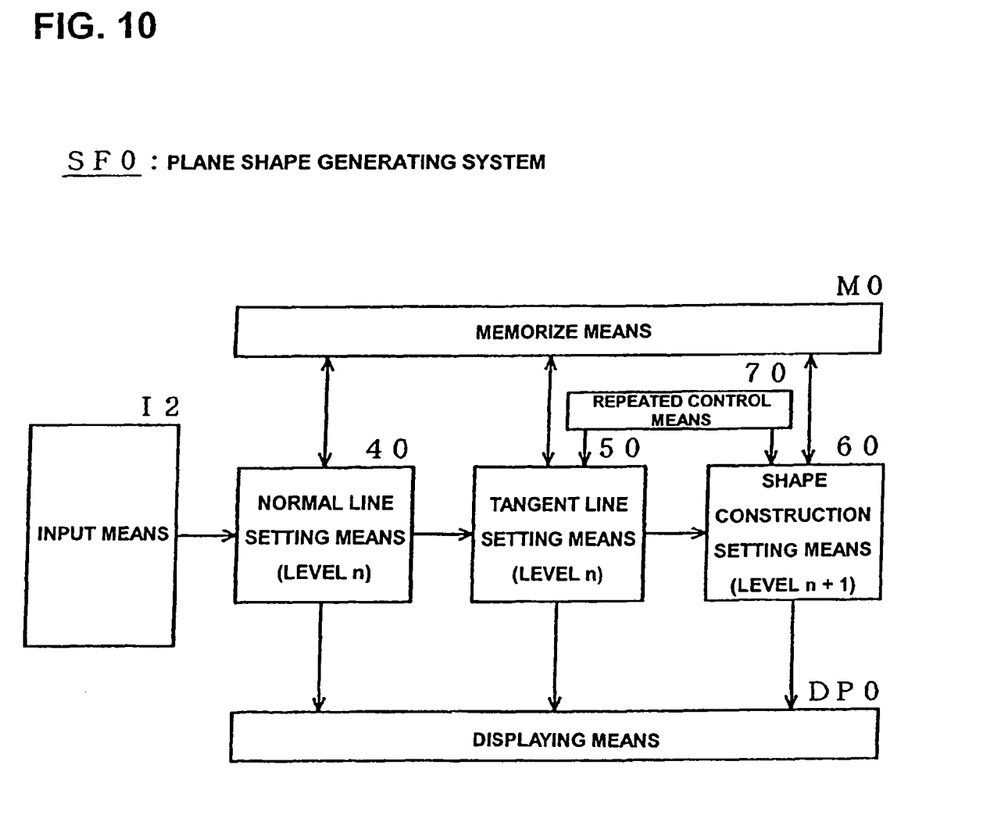
FIG. 10 is a block diagram, which shows control of generating system SF0 of the plane shape, and plane shape generation process, which is practical example of this invention.

FIG. 10 is a block diagram which shows the composition of generating system SF0 of the plane shape which is practical example of this invention.

Generating system SF0 of the plane shape calls the fixed polygonal plane patch polygonal plane patch of level 0 and each vertex (top position) of polygonal plane patch of n of level 0 described above is called shape composition point of level 0 and moreover generating system of the plane shape which is established based on polygonal plane patch of n of level 0 described above and shape composition point of level 0 described above in the shape is called.

And, generating system SF0 of the plane shape has repeat control means of 70 in normal line setting means of 40 of level n and tangent line setting means of 50 of level n and shape composition point setting means of 60 of level (n+1).

Normal line setting means of 40 of level n is a means for setting the normal line of level n in each of shape composition point of level n (the integer in which n is positive 0).

Tangent line setting means of 50 of level n decomposes normal line of each set level n on the tangent line which is equivalent to normal line of level n described above, and moreover, a means for setting the tangent of level n by decomposing for direction equal to the edge of polygonal plane patch of level n described above or vicinity of the edge is considered.

Shape composition point setting means of 60 of level (n+1) is a means for setting shape composition point of level (n+1) based on the tangent line of two n described above.

It is a means for repeatedly executing the action between 1 increment of n described above and normal line setting means of 40 of level n and tangent line setting means of 50 of level n and shapes composition point setting means of 60, and after, as n=0, normal line setting means of 40 of level n and tangent line setting means of 50 of level n and shape composition point setting means of 60 of level (n+1) are operated by repeat control means of 70.

To begin with, (S21) and normal line setting means of 40 of level n set the normal line of level 0 as n=0 in each of shape composition point of level 0, (S22).

Next, each normal line of set level 0 is decomposed on the tangent plane in which tangent line setting means of 50 of level n is equivalent to normal line of level 0 described above, and moreover, the tangent line of level 0 is set by decomposing for direction equal to the edge of triangle plane patch PP1 of level 0 or vicinity of the edge, (S23).

Then, shape composition point setting means of 60 of level (n+1) sets shape composition point of the level 1 based on two tangent lines of level 0 described above (S24).

Whether it has set all of shape composition point of the level 1 is judged here (S25) and within shape composition point of the level 1, it returns in step S23, if the result which it has not yet set has remained.

In the meantime, the shape generating action is finished at step S26, if it does not need to raise the accuracy of the shape of the desire further.

In short, the action that sets the direction of the tangent line is quick according to the practical example described above because to uniformly set the direction of the tangent line on the tangent plane that is equivalent to normal line is possible Further in the meantime, in the case that accuracy of the shape of the desire must be raised, if shape composition point of the level 1 has been all set, (S26), and repeat control means 70 do the increment of n described above together and repeatedly can be made to execute the action between normal line setting means of 40 of level n and tangent line setting means of 50 of level n and shape composition point setting means of 60 of the increment, (S22~S26).

In short, as n=1 in which normal line setting means of 40 of level n sets the normal line of level n in each of shape composition point of level n, (S22) and normal line of each set level n is decomposed on the tangent plane in which tangent line setting means of 50 of level n is equivalent to normal line of level described above, and moreover, in addition, it decomposes for direction equal to the edge of triangle plane patch of level n or vicinity of the edge, (S23), Shape composition point setting means of 60 of level (n+1) sets shape composition point of level (n+1) based on two tangent line of level n described above, (S24).

Moreover, it decomposes for direction equal to the edge of triangle plane patch of level n or vicinity of the edge.

It returns here in step S23, if the result which it has not yet set within shape composition point of level n has remained, (S25), and repeat control means of 70 do 1 increment of n described above, if (S25) and accuracy of the shape of the desire must be further raised, (S26), if shape composition point of level n has been all set, (S27).

Simultaneously, the action between normal line setting means of 40 of level n and tangent line setting means of 50 of level n and shape composition point setting means of 60 is repeatedly executed, (S22~S25).

In the meantime, the shape generating action is finished at step S26, if it does not need to raise the accuracy of the shape of the desire further.

Still, the vertex (top position of shape composition point of level 0) in which plane patch of the pentagonal state is adjacent is used as a polygonal plane patch, when plane patch of the pentagonal state is used, and shape composition point of the level 1 is set, and by shape composition point of the level 1 and two shapes composition point of level 0, and moreover by shape composition of level 2 and shape composition point of level 2 is set, the following and these actions are repeated.

And moreover the shape composition point is sequentially set.

On polygonal plane patch of hexagonal planes patches, etc., shape composition point are also sequentially set in the same way of description above.

And, the actual example described above is also possible to apply the practical example described above in the case in which the appropriation including the plane is partially created, though it is established in the shape on the assumption of the curved surface, and case in which it is established by multiple planes in the shape.

According to the each practical example described above, it is possible that it comes out of doing the geometric representation by the decision easy vector relation, and clearly and accurately does the geometric representation, when the geometric representation (the curved surface is created for example) is done, without expressing as a nonlinear relationship with the difficult decision, (it is expressed as a linear relation).

In short, the action which sets the direction of the tangent line is quick according to the practical example described above, because to uniformly set the direction of the tangent line on the tangent plane which is equivalent to normal line is possible.

As this result, the mechanism of the geometric representation is brief, and it is possible that to simply construct the geometric representation mechanism is possible, and that therefore, the processing speed is very high-speed, and that it efficiently deals with it. Therefore, it is possible to lightly and easily deal with even in the personal computer without requiring the supercomputer, when the curved surface shape is created. And, according to the each practical example described above, it is possible to univocally obtain the direction of the tangent line, because the shape is created using the tangent plane, and it is possible that therefore, it is rendering at high speed, and the expression accuracy is improved (the real image is made by CG).

And, though in the example, the interface of the control polygon is made until now, according to the each practical example described above, it is possible to create the curved surface without the interface in nothing, and it is possible that the curved surface is efficiently created.

Similarly, it is possible to efficiently realize design evaluation system such as finite element method and boundary element method without interface and pretreatment (preprocessor).

In addition, it can also freely and efficiently create the direction of the normal line described above in what kind of complicated shape in the easiness and in the accuracy presence introducer because it is possible to control the direction of the normal line necessary for establishing according to each superscription practical example in the shape and namely the human can operationally control directly the direction of the normal line which means an inclination of tangent plane.

Then it is possible that it can operationally control it directly and visually and efficiently easily create the shape of the desire because parameters such as the weight (load) and special control requirement (the for example control polygon) are not required according to the each practical example described above and as an initial condition, it can be established only by giving normal line of the desire for shape composition point existing in the boundary in the shape.

And, by synthesizing and expressing the plane patch of triangular shape and basic forms such as quadrangular, it is possible that it easily and efficiently create the shape of the desire even in the polyhedron composed of what kind of polygon according to the each practical example described above.

In addition, the data is brief, when it is said from the viewpoint of the data and it is possible that the process of the shape generating efficiently realizes support systems (that is to say, database and memory the saving mechanism the data home page) of course because it is possible to create the shape according to the each practical example described above by sequentially covering the tangent plane, and moreover, it is possible to decide the expression accuracy of the sufficient shape by controlling.

Then, according to the each superscription practical example, it is possible that only that the direction of the normal line is changed creates the shape of the concave surface (connotation system, negative normal line standard, string standard generating) from shape generating of the convex surface (capsula externa system, positive normal line standard, tangent standard generating), and it is possible that it is reverse-directional the and creates the shape.

Therefore, it is possible to create the shape in which the convex surface intermingles with concave surface easily and efficiently simultaneously create surface.

Still, the fixed polygonal plane patch is called polygonal plane patch of level 0 as a program of the practical example described above and each vertex (top position) of polygonal plane patch of level 0 described above is called shape composition point of level 0, and moreover it is generating program of the plane shape which is established based on polygonal plane patch of level 0 described above and shape composition point of level 0 described above in the shape.

In this program, the normal line of level 0 is set in each of shape composition point of level 0 described above and each normal line of set level 0 is decomposed on the tangent plane which is equivalent to normal line setting procedure of level 0 described above for memorizing for the memory and normal line of level 0 described above.

In this case, the tangent line of level 0 is set by decomposing for direction equal to the edge of polygonal plane patch of level 0 described above or vicinity of the edge and based on tangent setting procedure of level 0 for memorizing for the memory and two tangent lines o level 0 described above, shape composition point of the level 1 is set.

It is an example of the program in which the computer is made to execute the shape composition point setting procedure of level 1 memorized for the memory. And, the practical example described above calls the fixed polygonal plane patch with polygonal plane patch of level 0 and each vertex (top position) of polygonal plane patch of level 0 described above is called shape composition point of level 0, and moreover it is a program of plane shape which is established based on polygonal plane patch of level 0 described above and shape composition point of level 0 described above in the shape.

It is a program of plane shape, which is established based on polygonal plane patch of level 0, described above and shape composition point of level 0 described above in the shape.

In each of shape composition point of level n described above (the integer in which n is positive 0), the normal line of level n is set, and moreover on the tangent plane which is equivalent to normal line setting procedure of level n memorized for the memory and normal line of level n described above and the normal line of each level n which set the described above is a direction equal to the edge of polygonal plane patch of level n described above and by decomposing the normal line of each level n which set the description for direction equal to the edge of polygonal plane patch of level n described above or vicinity of the edge, or the tangent line of level n is set by decomposing for the vicinity of the edge.

Based on tangent line setting procedure of level n memorized for the memory and two tangent lines of level n described above, shape composition point of level (n+1) is set and it is an example of the program in which the computer is made to execute shape composition point setting procedure of level (n+1) memorized for the memory.

In this case, after normal line setting procedure of level n described above and tangent line setting procedure of level n described above as n=0 described above and shape composition point setting procedure of level (n+1) described above is executed, 1 increment of n described above and normal line setting procedure of level n described above and tangent line setting procedure of level n described above, the computer is made to execute repeat control procedure for repeatedly executing the shape composition point setting procedure of level (n+1) described above.

Again, by the repeat control procedure described above, by repeatedly executing 1 increment of n described above and normal line setting procedure of level n described above and tangent line setting procedure of level n described above and shape composition point setting procedure of level (n+1) described above, the full face of polygonal plane patch of level 0 described above is covered in tangent plane, and the plane shape of the desire is formed.

In addition, the program described above may be recorded in recording medium such as semiconductor memory and FD, CD, DVD, HD.

INDUSTRIAL APPLICABILITY

This invention is useful for various systems such as various processing systems, games generation support system, geographic information analysis system, disaster prevention relation forecasting system, three-dimensional map systems, medical diagnosis systems, training simulator such as flight simulator variously, molecular design support system, design aid analysis system, virtual reality generation system including aspheric surface processing.

The invention claimed is:

1. A method for generating/displaying a plane shape, comprising the steps of:
   setting a normal line, which is equivalent to a tangent plane of a curved surface of an object shape, at each vertex of a triangle shape plane patch which is a basic form necessary for generating/displaying the object shape,
   decomposing, in a specific direction, said set normal line on a tangent plane at said each vertex of the triangle shape plane patch, thus setting a tangent line;
   forming, between two corresponding vertexes of said triangle shape plane patch and in a direction based on said two corresponding vertexes, an equivalent normal line that becomes a new tangent plane of the object shape;
   determining another tangent line at where said normal line is formed; and
   further determining a normal line equivalent to the tangent plane of the curved surface,
   thus creating the object shape; and
   displaying the object shape on a display.

2. The method for generating/displaying a plane shape according to claim 1, wherein new normal lines are set sequentially between vertex normal lines or between sides of said triangle shape plane basic patch, thus forming a new triangle shape plane patch with said normal lines.

3. The method for generating/displaying a plane shape according to claim 1, wherein new normal lines are set sequentially and repeatedly between vertex normal lines or between all triangle shape plane patches.

4. The method for generating/displaying a plane shape according to claim 1, wherein setting of new normal lines based on triangle shape plane patch formed by set normal lines is sequentially performed repeatedly until reaching a display precision of the object shape.

5. The method for generating/displaying a plane shape according to claim 1, wherein, the method is executed by a system for selecting a basic patch which is set with a normal line among basic triangle shape plane patches representing a schematic shape of the object shape.

6. The method for generating/displaying a plane shape according to claim 1, wherein a new normal line is set by sequentially selecting triangle shape plane basic patch on which a normal line is set, thus forming an entire shape of the object shape recursively.

7. A method for generating/displaying a plane shape according to claim 1, comprising the steps of at each vertex of a triangle shape plane patch that is based on a predetermined normal line and a predetermined positional information, determining a normal line which is equivalent to a predetermined tangent plane at a predetermined position; and utilizing a contact point information of the normal line and tangent plane, forming a basic patch for the triangle shape plane patch.

8. A method for generating/displaying a plane shape according to claim 1, comprising the steps of at each vertex of a triangle shape plane patch that is based on a predetermined normal line and a positional information thereof, determining a normal line which is equivalent to a predetermined tangent plane at a predetermined position; and with a basic patch formed by utilizing a normal line that is equivalent to a curved surface and an existing position thereof, forming an object shape.

9. The method for generating/displaying a plane shape according to claim 7 or 8, further comprising the steps of:

combining vertexes where said predetermined normal lines exist;

decomposing a normal line existing at each of predetermined vertexes of a predetermined triangle shape plane patch on a predetermined equivalent tangent plane, and at a position where a normal line that is equivalent to a predetermined new tangent plane between two vertexes, determining a normal line in a direction based on two predetermined corresponding vertexes.

10. The method for generating/displaying a plane shape according to claim 7 or 8, further comprising the steps of:

combining vertexes, where predetermined normal lines exist, until reaching a necessary shape generating/displaying precision;

decomposing a normal line, existing at each of predetermined vertexes, on an equivalent tangent plane, and at a position where a normal line that is equivalent to a predetermined new tangent plane between two vertexes, repeating actions of determining a normal line in a direction based on said two corresponding vertexes, thus generating and displaying an intended shape.

* * * * *